US007889904B2

(12) United States Patent
Sato

(10) Patent No.: US 7,889,904 B2
(45) Date of Patent: Feb. 15, 2011

(54) IMAGE PROCESSING DEVICE, IMAGE PROCESSING METHOD, PROGRAM, STORAGE MEDIUM AND IMAGE PROCESSING SYSTEM

(75) Inventor: Makoto Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1044 days.

(21) Appl. No.: 11/011,414

(22) Filed: Dec. 13, 2004

(65) Prior Publication Data

US 2005/0157916 A1 Jul. 21, 2005

(30) Foreign Application Priority Data

Jan. 15, 2004 (JP) ............................. 2004-008119

(51) Int. Cl.
*G06K 9/00* (2006.01)
*G06K 9/40* (2006.01)

(52) U.S. Cl. ..................... 382/130; 382/132; 382/274; 382/124; 382/128; 382/254; 382/275

(58) Field of Classification Search .............. 382/128, 382/132, 161, 294, 130, 131, 169, 173, 260, 382/256; 600/407
See application file for complete search history.

(56) References Cited

U.S. PATENT DOCUMENTS

| | | | | |
|---|---|---|---|---|
| 5,359,513 A * | 10/1994 | Kano et al. | .................. | 382/128 |
| 5,717,791 A | 2/1998 | Labaere et al. | | |
| 5,982,927 A * | 11/1999 | Koljonen | ..................... | 382/168 |
| 5,982,953 A * | 11/1999 | Yanagita et al. | ............. | 382/294 |
| 5,999,652 A * | 12/1999 | Bushman | ..................... | 382/221 |
| 6,215,848 B1 * | 4/2001 | Linders et al. | ........... | 378/98.12 |
| 6,363,163 B1 * | 3/2002 | Xu et al. | ..................... | 382/130 |
| 6,577,752 B2 * | 6/2003 | Armato et al. | .............. | 382/131 |
| 6,678,399 B2 * | 1/2004 | Doi et al. | ..................... | 382/131 |
| 6,934,409 B2 * | 8/2005 | Ohara | ......................... | 382/132 |
| 6,965,416 B2 | 11/2005 | Tsuchiya et al. | | |
| 6,970,587 B1 * | 11/2005 | Rogers | ........................ | 382/132 |
| 6,993,203 B2 | 1/2006 | Ozawa et al. | | |
| 7,032,700 B2 * | 4/2006 | Sakai et al. | .................. | 180/273 |
| 7,043,066 B1 * | 5/2006 | Doi et al. | ..................... | 382/132 |
| 7,308,126 B2 * | 12/2007 | Rogers et al. | ............... | 382/132 |
| 7,359,542 B2 * | 4/2008 | Oosawa | ...................... | 382/132 |
| 7,386,157 B2 * | 6/2008 | Tago et al. | .................. | 382/130 |
| 7,392,078 B2 * | 6/2008 | Imai | ............................ | 600/436 |
| 7,490,085 B2 * | 2/2009 | Walker et al. | .................. | 707/10 |
| 2007/0260137 A1 * | 11/2007 | Sato et al. | .................... | 600/407 |

FOREIGN PATENT DOCUMENTS

EP   1137258 A3   4/2002
JP   06-022218 A   1/1994

(Continued)

*Primary Examiner*—Wesley Tucker
*Assistant Examiner*—Nancy Bitar
(74) *Attorney, Agent, or Firm*—Canon U.S.A., Inc. I.P. Division

(57) ABSTRACT

An image processing device includes an image input portion that inputs two images, an image processing portion that applies image processing to the two images to generate processed images, and a difference processing portion that performs difference processing between the processed images to generate and output a difference image. The image processing portion performs the image processing on the basis of an image processing condition selected by a processing-condition selection portion.

20 Claims, 6 Drawing Sheets

FOREIGN PATENT DOCUMENTS

| | | | |
|---|---|---|---|
| JP | 10-091779 A | 4/1994 |
| JP | 07-037074 A | 2/1995 |
| JP | 08-329242 A | 12/1996 |
| JP | 2001-275015 A | 10/2001 |
| JP | 2001-344601 A | 12/2001 |
| JP | 2002-133408 A | 5/2002 |

* cited by examiner

IMAGE PROCESSING DEVICE, IMAGE PROCESSING METHOD, PROGRAM, STORAGE MEDIUM AND IMAGE PROCESSING SYSTEM

BACKGROUND OF THE INVENTION

1. Field of the Invention

The present invention relates to an image processing device, an image processing method, a program, a storage medium and an image processing system and more specifically to an image processing device, an image processing method, a program, a storage medium and an image processing system for performing image registration and difference processing between images.

2. Description of Related Art

The use of digital images in medical diagnostic imaging is rapidly increasing due to its advantages over conventional image radiographic systems. In digital radiography, a radiographic device using a semi-conductor image sensor is used to capture X-ray images. Such a radiographic device has the practical advantage of being able to record images in an extremely wide range of radiation exposure as compared with a conventional radiographic system using silver-halide films. Further, such a radiographic device has the practical advantage of being able to constitute an effective system in terms of storage and transmission of images.

Further, digitization of medical images has improved the diagnosis of such medical images. For example, when a conventional film radiographic system is used to read and compare X-ray images taken at different points of time for observation of the progress of a patient's disease, a radiologist generally views films on an X-ray film illuminator and performs comparative reading of the X-ray films.

When digitized image data is used, two digital images captured at different points of time are subjected to image registration so that corresponding locations in the two images are aligned with each other with respect to a normal anatomic structure. Subsequent to image registration, difference processing is performed to generate and output a difference image. A radiologist then reads and compares the difference image with the two original images so that changes occurring between the radiographs can be accurately determined.

A method for generating such a difference image is disclosed, for example, in U.S. Pat. No. 5,359,513, in which two chest X-ray images captured at different points of time are subjected to image registration and difference processing to generate a difference image. This difference processing is also known as temporal subtraction processing.

FIG. 6 is a block diagram showing a conventional image processing device for generating the above-described difference image. In FIG. 6, a first image and a second image indicate medical image data of a specific region captured at different points of time. A density correction portion 401 corrects the two image data such that the distribution of density values of image signals on one image becomes approximately equal to that on the other image. Then, an image registration portion 402 obtains and corrects the positional relationship between anatomic structures on the two images. A difference calculating portion 403 performs difference processing between corresponding pixels of the two images to generate a difference image. A display portion 405 displays the difference image along with the first and second images.

The two images are output to analog films or are displayed on a monitor for comparison with the difference image. Gradation characteristics of the medical images are also adjusted and matched with characteristics of the analog films. The disadvantage, however, is that it may be difficult to obtain gradation characteristics when a shadow portion is present in the medical image because the amount of signal corresponding to the shadow portion is small.

For example, in a chest X-ray image, an image of the lung field has high contrast, while an image of the mediastinal portion has low contrast. The shadow present in the image of the mediastinal portion provides a small amount of signal.

The above-described difference processing enables a difference image to show changes having occurred at two different points of time and, therefore, can improve the efficiency of comparative reading and prevent oversight of the changes. However, it is difficult to generate a difference image showing changes having occurred in an essentially low-contrast region, such as the mediastinal portion, in the same manner as in a high-contrast region, such as the lung field.

Moreover, in the case of comparative reading in lung disease, it is necessary to grasp average changes in size and density of a low-contrast shadow area having a certain degree of breadth, such as that caused by inflammation in the lung field. In conventional difference processing, however, if a change has occurred in a structure, such as a blood vessel, overlapping with such a shadow area, a difference image generated may also show a difference caused by that change. Therefore, some difference images may make it difficult for a radiologist to grasp changes in a specific shadow.

SUMMARY OF THE INVENTION

Various aspects of the present invention can be found in an image processing device, an image processing method, a program, a storage medium and an image processing system that are configured to apply image processing to captured images by smoothing high-frequency components or high-frequency coefficients thereof so as to enable a radiologist to easily observe changes of a target object in a difference image.

The image processing device of the present invention comprises image input means for inputting two images, image processing means for applying image processing to the two images to generate processed images, and difference processing means for performing difference processing between the processed images to generate and output a difference image.

The image processing method of the present invention comprises an image input step of inputting two images, an image processing step of applying image processing to the two images to generate processed images, and a difference processing step of performing difference processing between the processed images to generate and output a difference image.

The program of the present invention for causing a computer to perform an image processing method comprises an image input step of inputting two images, an image processing step of applying image processing to the two images to generate processed images, and a difference processing step of performing difference processing between the processed images to generate and output a difference image.

The computer-readable storage medium of the present invention has a program stored thereon for causing a computer to perform an image processing method comprising an image input step of inputting two images, an image processing step of applying image processing to the two images to generate processed images, and a difference processing step of performing difference processing between the processed images to generate and output a difference image.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the present invention will now be described in detail below with reference to the accompanying drawings.

First Embodiment

Figure 1:
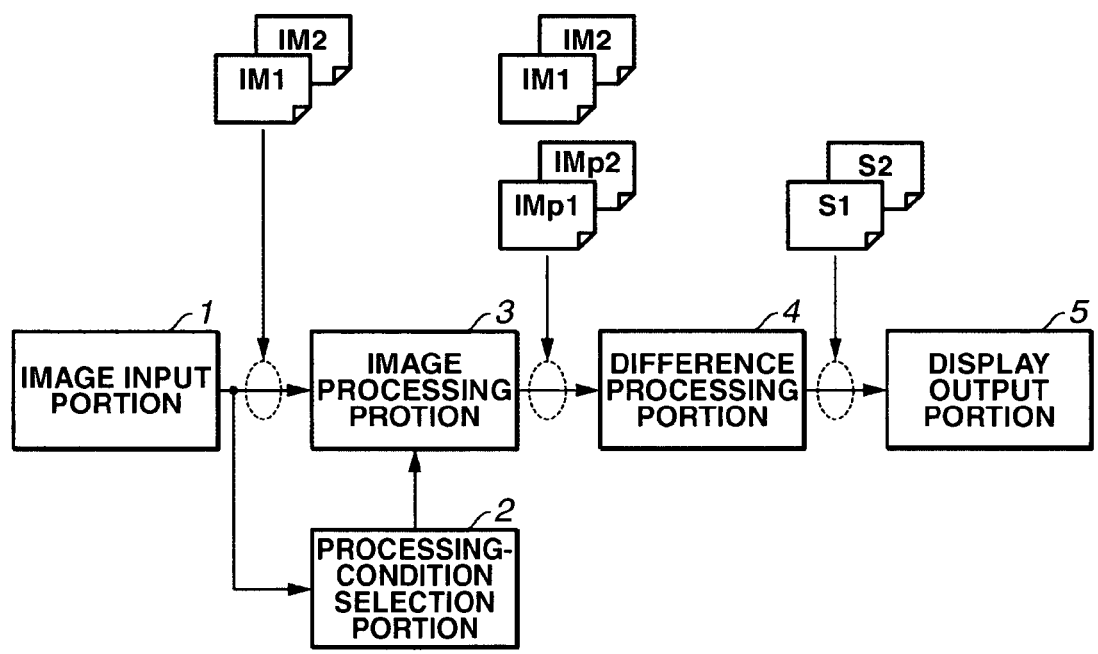
FIG. 1 is a block diagram showing an image processing device according to a first embodiment of the invention.

FIG. 1 is a block diagram showing an image processing device according to a first embodiment of the invention. Referring to FIG. 1, an image input portion 1 inputs at least two images captured at different points of time (hereinafter referred to as the "temporally sequential images"). An image processing portion 3 applies predetermined image processing to the temporally sequential images to generate processed images. A difference processing portion 4 performs difference processing between the processed images to generate a difference image. The difference processing portion 4 outputs the difference image to a display output portion 5.

It should be noted that the image processing device can be implemented, for example, by using a combination of a computer and software installed thereon. In this case, each portion shown in FIG. 1 can be obtained by software modules or specific hardware. Operation of each portion is described in detail below.

In response to predetermined instructions, the image input portion 1 inputs temporally sequential images, which are to be subjected to difference processing. The image input portion 1 corresponds, for example, to a storage medium, such as a hard disk or a magneto-optical disk, or a file server connected directly or indirectly to a computer via a network, or an image capture device for generating medical X-ray images. The temporally sequential images are a group of images of the same body region of a patient captured at different points of time. Instructions to the image input portion 1 for inputting temporally sequential images are given by a user operating the image processing device or by a control program or the like (not shown) for controlling the image processing device.

In FIG. 1, the image input portion 1 outputs temporally sequential images IM1 and IM2 to the image processing portion 3. It is assumed in the first embodiment that the image IM1 is captured before the image IM2. In the following discussion, the images IM1 and IM2 are front chest images, but are not limited to those.

The image processing portion 3 applies predetermined image processing to the temporally sequential images IM1 and IM2 to generate processed images IMp1 and IMp2, respectively. The image processing portion 3 outputs, to the difference processing portion 4, the processed images IMp1 and IMp2 along with the temporally sequential images IM1 and IM2. Prior to image processing, the image processing portion 3 uses a condition received from processing-condition selection portion 2 for image processing, and performs the image processing based on the received condition.

The processing-condition selection portion 2 selects and outputs the image processing condition for use in the image processing portion 3. Prior to selection of the image processing condition, the processing-condition selection portion 2 receives, from the image input portion 1, ancillary information associated with image signals of temporally sequential images IM1 and IM2 for image processing. In the first embodiment, the ancillary information is information about gradation characteristics of the temporally sequential images IM1 and IM2, or information as to whether a region of interest is previously set in the temporally sequential images IM1 and IM2 and information on the location and size of the region of interest in the temporally sequential images IM1 and IM2 when the region of interest is previously set. The information about gradation characteristics indicates what gradation characteristics the temporally sequential image IM1 or IM2 has with respect to the amount of X-ray used for image capturing. In the first embodiment, the information about gradation characteristics is a flag for indicating whether the temporally sequential image IM1 or IM2 has linear gradation. In accordance with a value of the flag, for example, if the temporally sequential image IM1 or IM2 has linear gradation, the processing-condition selection portion 2 issues instructions to the image processing portion 3 for switching image processing conditions for use in the image processing portion 3.

Operation of the image processing portion 3 is now described below. In the first embodiment, the processed images IMp1 and IMp2 are calculated based on the following equations (1) and (2):

$$IMp1(x,y) = IM1(x,y) \times f(IM1a(x,y)) \quad (1)$$

$$IMp2(x,y) = IM2(x,y) \times f(IM2a(x,y)) \quad (2)$$

where (x, y) indicates a location on each image. For example, IMp1 (x, y) represents a pixel value of the processed image IMp1 at the location (x, y). IM1$a$ and IM2$a$ are average images obtained by applying an averaging process to the temporally sequential images IM1 and IM2.

Figure 2A:
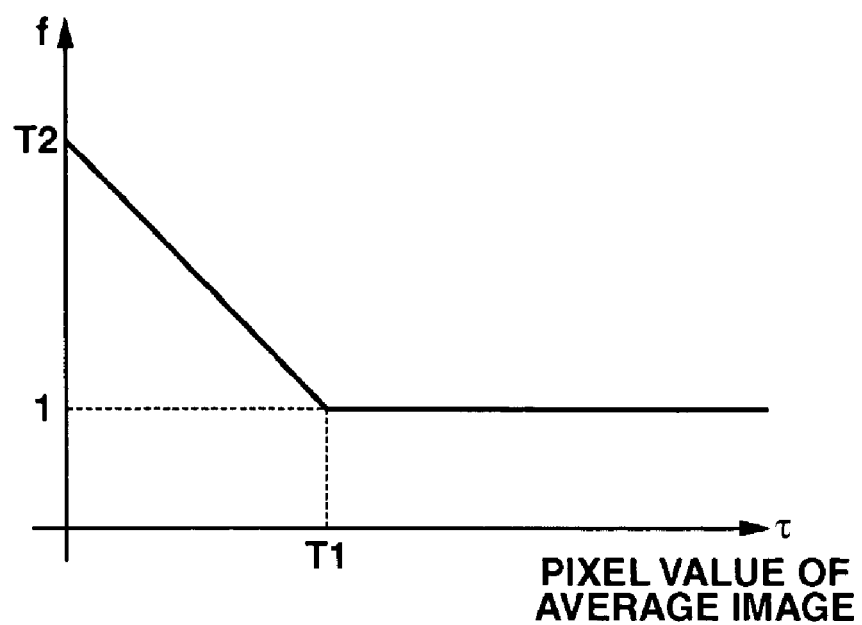
FIGS. 2A and 2B are diagrams illustrating examples of gradation processing characteristics in the first embodiment.

The averaging process may be performed by replacing a target pixel p(x, y) with an average value of adjacent pixels in a given range including the pixel p(x, y), or by using a low-pass filter having a given band-pass property.

f(t) represents a function having an input-output characteristic such as that shown in FIG. 2A. f(t) is used to determine an output value, which enhances contrast in an area having a low pixel value of the average image. Accordingly, contrast in low-luminance (or low-density) areas on the temporally sequential images is improved based on the processing operations represented by the equations (1) and (2).

For example, in the case of front chest images, the processed images IMp1 and IMp2 have contrast of the mediastinal portion improved with respect to the original images IM1 and IM2. Therefore, subtle signal changes occurring in the mediastinal portion can be extracted by performing difference processing.

If the processing-condition selection portion 2 issues the above-described instructions for switching image processing conditions, the image processing portion 3 selects a function having a different characteristic. For example, if a temporally sequential image has linear gradation, a function that always outputs "0" is used as f(t). In this case, a processed image obtained from the temporally sequential image becomes identical to the input temporally sequential image. Thus, no enhancement processing is performed in substance.

In addition, the value T2 shown in FIG. 2A may be changed. More specifically, if the temporally sequential image has linear gradation and the processing-condition selection portion 2 issues instructions for switching image processing conditions, the value T2 is made smaller than when the temporally sequential image has nonlinear gradation. Thus, processing is performed with the degree of enhancement smaller.

Alternatively, the value T1 may be made smaller to limit an area in which enhancement processing is performed to an area having lower pixel values. Then, an area to be subjected to enhancement processing is limited as a whole.

Thus, even if temporally sequential images have different gradation characteristics, difference processing can be performed while reducing influence on image quality.

More specifically, an image output from an image forming device, such as a solid-state sensor, essentially has linear gradation. However, a chest X-ray image is often corrected to have nonlinear gradation for the purpose of enhancing contrast in the lung field, which is important to interpretation of radiogram.

If an image is subjected to such gradation correction, signal contrast in the mediastinal portion is low. On the other hand, if an image has linear gradation, contrast in the mediastinal portion has a certain level. If the same enhancement processing for the mediastinal portion is applied to such two images having different kinds of characteristics, it might have an adverse effect on the images, such as enhancement of noise.

In addition, if the above-described ancillary information of a temporally sequential image is information as to whether a region of interest is previously set in the temporally sequential image, the above-described processing should be applied only to the region of interest.

When a radiologist observes the progress of a patient's disease by the use of difference processing, the radiologist ordinarily knows the location of a lesion. If it is desired to more enhance changes of the lesion, enhancement processing should be further applied to the lesion for ease of observation of the changes.

Figure 2B:
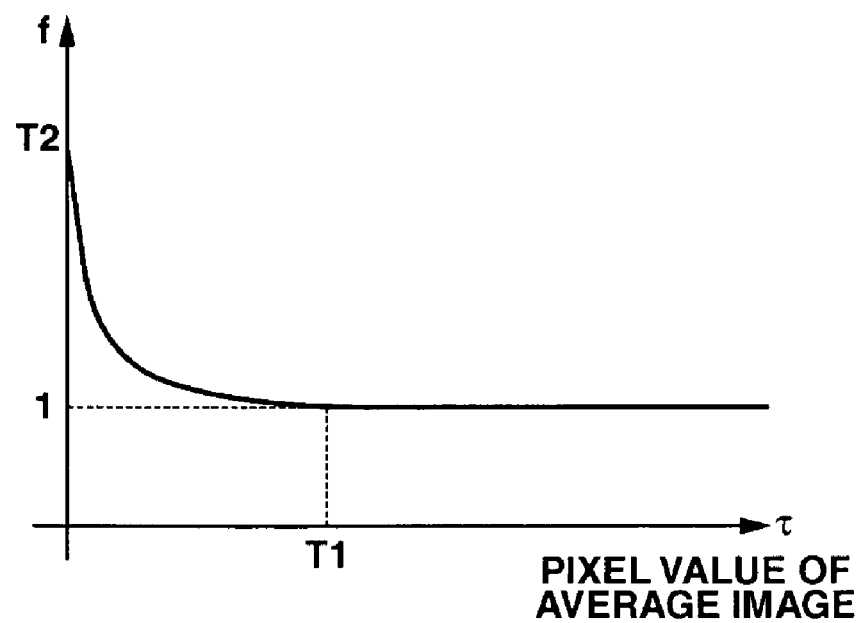

The image processing portion 3 may directly perform calculation processing based on the equations (1) and (2). Alternatively, the function f(t) may be previously stored in the image processing portion 3 as a plurality of look-up tables corresponding to combinations of the parameters T1 and T2, and the image processing portion 3 may select and use one of the look-up tables in accordance with the output of the processing-condition selection portion 2. In addition, gradation processing characteristics shown in FIG. 2B may be used. In FIG. 2B, an output value varies continuously in a differential fashion with respect to changes of the pixel value, so that it is difficult to produce false images. Both curves shown in FIGS. 2A and 2B indicate that output values monotonously decrease. Accordingly, contrast in low-luminance (or low-density) areas on the temporally sequential images is improved.

According to the above-described processing, the processed images IMp1 and IMp2 are generated from the temporally sequential images IM1 and IM2 supplied to the image processing portion 3 and are then output to the difference processing portion 4 along with the temporally sequential images IM1 and IM2.

The difference processing portion 4 applies difference processing to each of two pairs of temporally sequential images to generate and output two difference images S1 and S2. The difference image S1 is generated from the temporally sequential images IM1 and IM2, and the difference image S2 is generated from the processed images IMp1 and IMp2.

The difference processing portion 4 may use any method of matching locations of objects on two digital images to perform difference processing. For example, as disclosed in U.S. Pat. No. 5,359,513, the difference processing portion 4 performs image registration such that anatomic structures on two digital images are matched with each other. Furthermore, the difference processing portion 4 may directly perform image registration on the processed images such that the processed images are matched with each other in whole, without using information about the object.

In the first embodiment, the image processing device has the advantage that, since processing for changing pixel values is applied to the original image, a density correction portion is not necessarily required.

Figure 3:
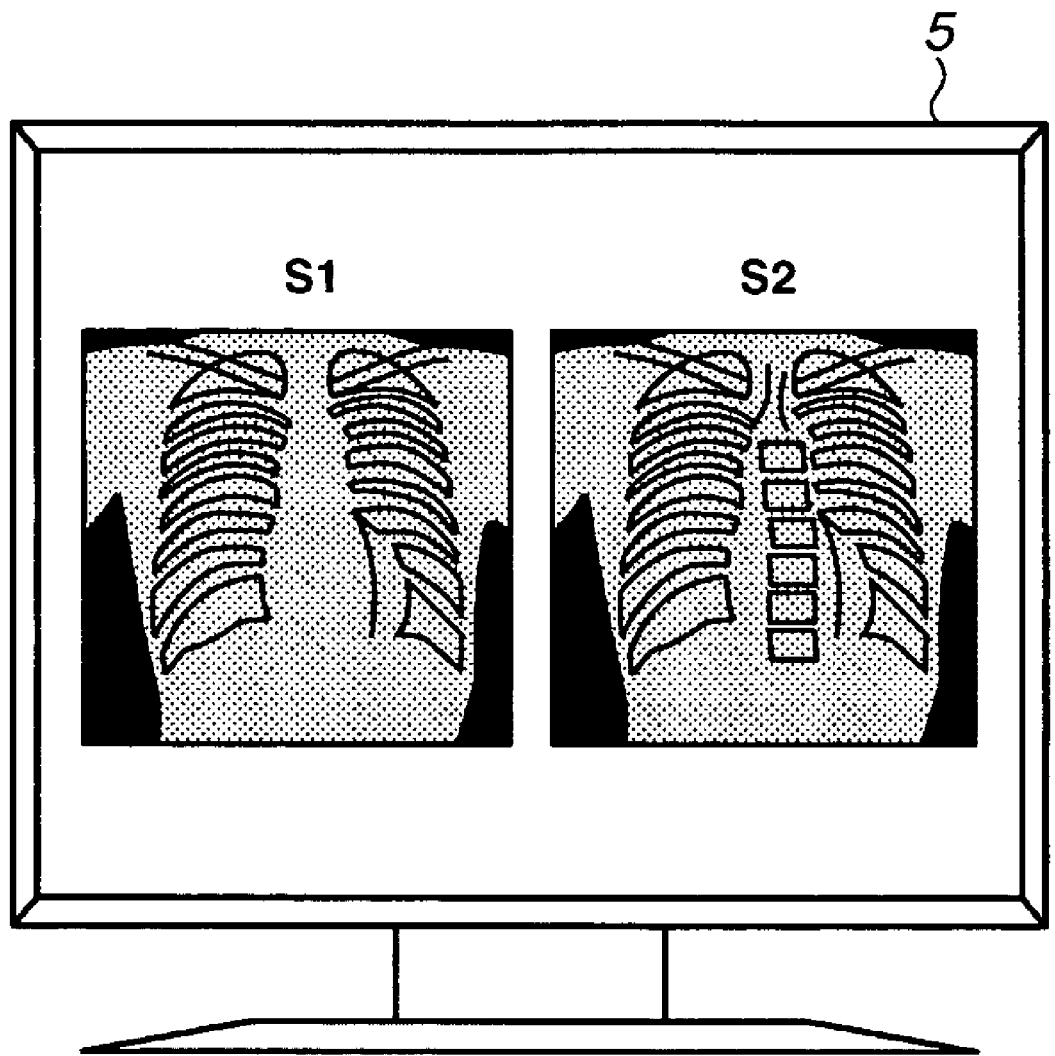
FIG. 3 is a diagram illustrating an example of side-by-side display of difference images according to an embodiment of the present invention.

The display output portion 5 may be a display device for displaying images, such as a CRT (cathode-ray-tube) monitor or a liquid crystal display, or an external storage device for storing images. Alternatively, the display output portion 5 may have a storage device and may selectively display stored processed images. In the first embodiment, the display output portion 5 is, for example, a liquid crystal display. FIG. 3 is a diagram illustrating the difference images S1 and S2 displayed on the display output portion 5. As shown in FIG. 3, the difference images S1 and S2 are displayed side by side on the display output portion 5.

Furthermore, the display output portion 5 can be a liquid crystal display capable of selectively displaying images stored in a storage device (not shown).

In this case, the image input portion 1 receives a plurality of pairs of associated images. The processing-condition selection portion 2 selects varying processing conditions. The image processing portion 3 applies the varying processing conditions to the plurality of pairs of images to generate a plurality of difference images. The plurality of difference images are then stored in the storage device (not shown).

The difference image S1 is generated from the temporally sequential images IM1 and IM2, which have not yet been subjected to image processing. Accordingly, the difference image S1 appropriately shows a difference in the lung field, as in conventional image processing devices. On the other hand, the difference image S2 is generated from the processed images IMp1 and IMp2, in which the mediastinal portion has been enhanced. Accordingly, the difference image S2 more appropriately shows the differences in the mediastinal portion than the difference image S1.

Displaying the difference images S1 and S2 side by side enables a radiologist to observe changes also in the mediastinal portion. While, in the case of FIG. 3, original images from which difference images are generated are not displayed, they may be displayed along with the difference images. Moreover, a plurality of display devices may be provided and original images and difference images may be respectively displayed on the plurality of display devices. Furthermore, as described above, even if the temporally sequential images IM1 and IM2 have different gradation characteristics, enhancement processing is varied depending on these characteristics. Accordingly, difference images can be obtained without being affected by characteristics of original images.

Second Embodiment

While, in the first embodiment, gradation processing is applied to original images and difference images are generated from the unprocessed and processed images, other processing types are applicable to the original image.

According to a second embodiment of the invention, the image processing portion 3 applies unsharp masking processing to the temporally sequential images IM1 and IM2 and outputs the processed images IMp1 and IMp2 to the difference processing portion 4. More specifically, the processed images IMp1 and IMp2 are calculated based on the following equations (3) and (4):

$$IMp1(x,y)=IM1(x,y)+w\times[IM1(x,y)-IM1a(x,y)] \quad (3)$$

$$IMp2(x,y)=IM2(x,y)+w\times[IM2(x,y)-IM2a(x,y)] \quad (4)$$

where w is a weighting factor. The weighting factor w and the masking size for use in calculating the average images IM1a and IM2a may be previously set and stored in the processing-condition selection portion 2, or may be set by a user via an input means (not shown) at the time of every processing. In the second embodiment, if the processing-condition selection portion 2 issues instructions for switching image processing conditions, the image processing portion 3 sets the weighting factor w to "0" or a relatively small value. Accordingly, in cases where a temporally sequential image has linear gradation, enhancement processing can be reduced as in the first embodiment.

The unsharp masking processing is performed to apply frequency enhanced processing to input images. In the case of front chest images, for example, the masking size can be set as follows. The processing-condition selection portion 2 selects a large masking size so as to enhance low-frequency components of the original images IM1 and IM2. The image processing portion 3 generates low-frequency-component enhanced images IMp1 and IMp2 using the large masking size.

With the unsharp masking processing performed, the difference image S1 appropriately shows a difference in an ordinarily observed structure, such as a blood vessel. On the other hand, the difference image S2 appropriately shows changes in structure corresponding to low-frequency components. In the case of lung disease, most of the shadows corresponding to lesions are light and low in contrast. Therefore, enhancing low-frequency components before difference processing enables the difference image S2 to more appropriately show changes in the lesions. In selecting the masking size, if the processing-condition selection portion 2 issues instructions for switching image processing conditions, a small masking size is selected, so that enhancement processing can be reduced.

If high-frequency components are to be enhanced depending on a region, the masking size should be set small. This setting enables the difference image S2 to appropriately show changes in a minute structure such as a blood vessel.

While, in the second embodiment, unsharp masking processing is employed as frequency processing, other processing types can be employed. In this case, the processing-condition selection portion 2 selects values of the weighting factors to be set for the respective frequency bands, so that frequency enhanced processing can be performed with respect to every frequency band.

The other portions of the second embodiment are relatively similar to those of the first embodiment and, therefore, the description thereof is omitted.

Third Embodiment

While, in the first embodiment, gradation processing is applied to original images and difference images are generated from unprocessed images and processed images, processing based on geometrical information of an object may be applied to original images.

Figure 5A:
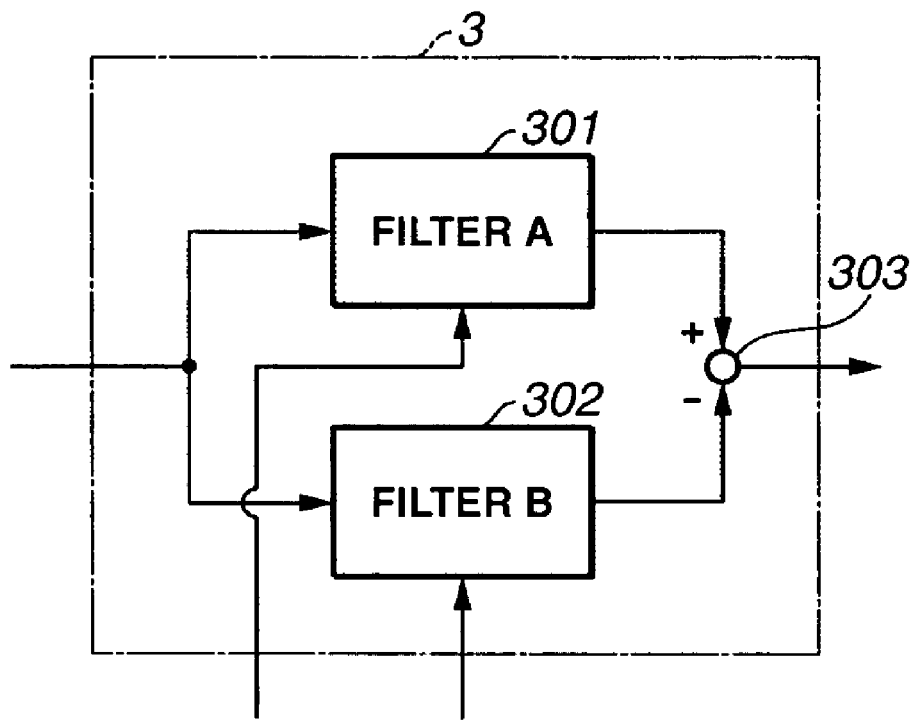
FIGS. 5A and 5B are diagrams illustrating an example of the construction of an image processing portion using filters according to an embodiment of the present invention.

FIG. 5A is a block diagram of the image processing portion 3 according to a third embodiment of the invention. The image processing portion 3 includes a filter (A) 301, a filter (B) 302 and a subtracter 303. The filter (A) 301 and the filter (B) 302 apply filter processing to images input to the image processing portion 3. Then, the subtracter 303 performs difference processing between the filter-processed images to generate and output a difference-processed image.

Figure 5B:
Figure 6:
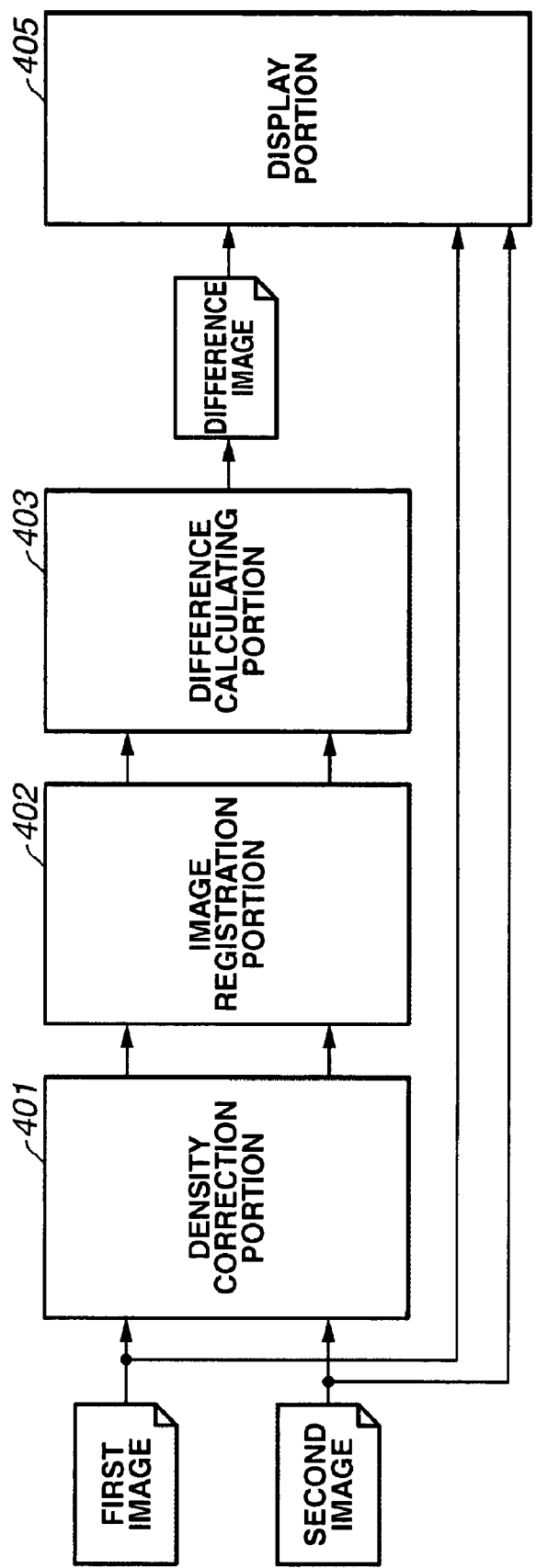
FIG. 6 is a block diagram showing a conventional image processing device.

The filter (A) 301 and the filter (B) 302 may be a so-called quoit filter using a morphological operation. The quoit filter is composed of a disk filter having a radius r1 and a ring filter having an inner radius r2 and an outer radius r3, as shown in FIG. 5B. A difference between morphological operation results obtained by the disk filter and the ring filter is taken as an output of the quoit filter. With the quoit filter used, an image having any isolated shadow enhanced can be obtained.

In the third embodiment, the processing-condition selection portion 2 selects and outputs optimum values of the radii r1, r2 and r3 to the image processing portion 3. Preferably, the values of the radii r1 and r3 approximate the radius of an object whose changes are to be detected, for example, the radius of a nodular opacity. Specifically, a user may select values of the radii r1, r2 and r3 via an input device, such as a keyboard or a mouse, at the time of processing. Alternatively, a user may beforehand determine the size of a shadow whose changes are to be detected and store this information in a memory or the like. In this case, the processing-condition selection portion 2 reads out the stored information.

It should be noted that the filters included in the image processing portion 3 are not limited to the above-described quoit filter. For example, a matched filter adapted to characteristics of a shadow whose changes are to be detected may be employed.

According to the above-described filter processing, an image in which a shadow having a circular or approximately circular shape has been enhanced is generated. Accordingly, the difference processing portion 4, which follows the image processing portion 3, can generate a difference image indicative of a difference between the enhanced shadows. Thus, the difference image can effectively show changes of a shadow of interest.

Fourth Embodiment

While, in the first to third embodiments, the display output portion 5 is configured to display two or more difference images side by side, the image processing device according to the invention is not limited to this configuration. According to a fourth embodiment of the invention, the display output portion 5 may be configured to selectively display one of the difference images S1 and S2.

Figure 4:
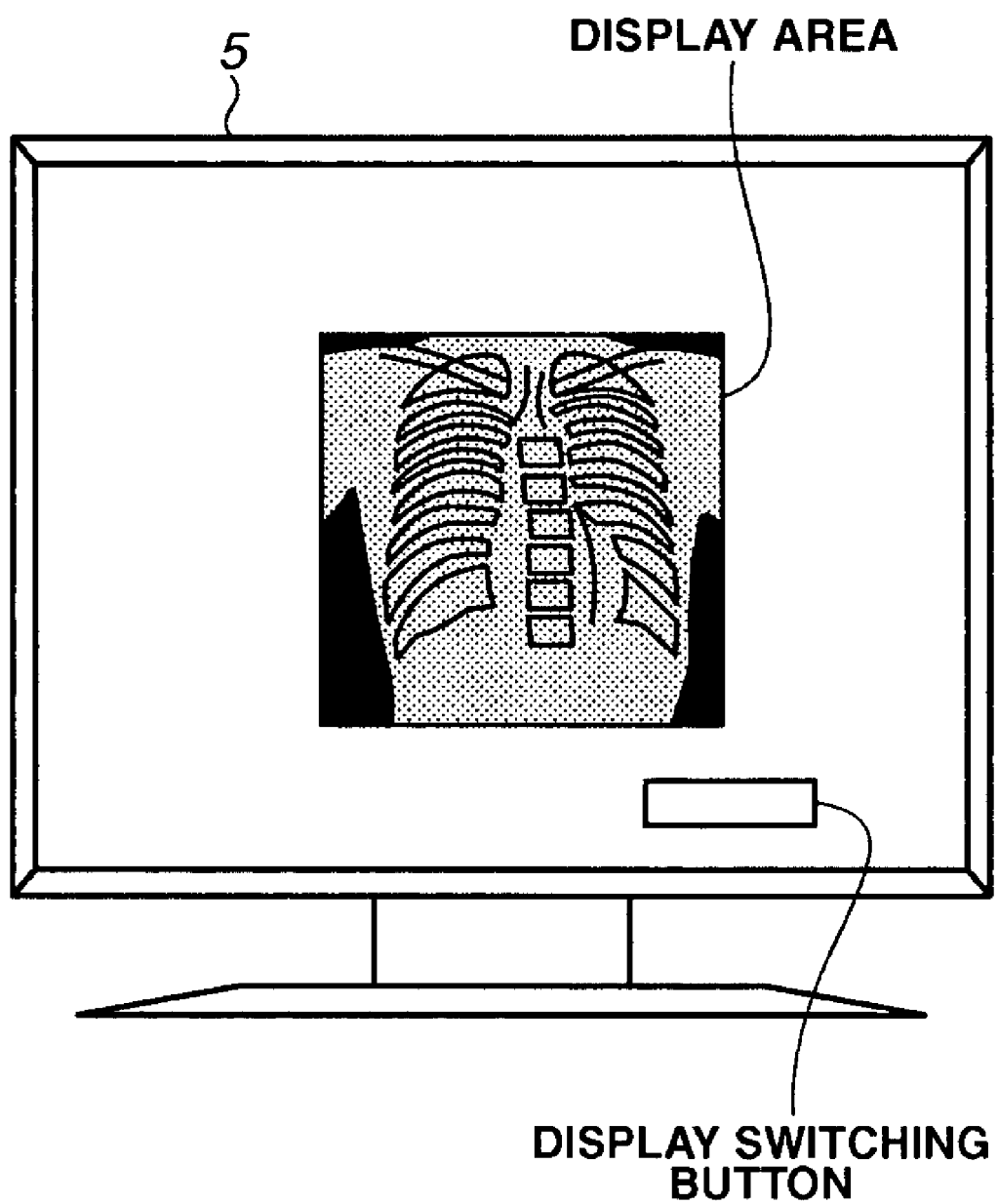
FIG. 4 is a diagram illustrating an example of switching display of difference images according to an embodiment of the present invention.

More specifically, as shown in FIG. 4, any one of the difference images S1 and S2 is selected by a user via a display switching button and is displayed on the same display area of the display output portion 5. With this configuration, a display area for displaying a difference image can be reduced.

Fifth Embodiment

While, in the first to fourth embodiments, a plurality of difference images generated on the basis of image processing conditions are concurrently or selectively displayed, the image processing device according to the invention is not limited to this configuration. According to a fifth embodiment of the invention, the display output portion 5 may be configured to display a single image obtained by combining a plurality of difference images.

More specifically, the display output portion 5 displays a single difference image S0. The difference image S0 is generated from the difference images S1 and S2 based on the following equation (5):

$$S0(x,y) = w1 \times S1(x,y) + w2 \times S2(x,y) \quad (5)$$

where w1 and w2 are weighting factors for the difference images S1 and S2, respectively.

The weighting factors w1 and w2 can be set beforehand in view of results of showing of differences on the composite difference image S0. With the single composite difference image S0 generated and displayed as described above, differences generated on the basis of a plurality of image processing conditions can be displayed as a single image.

Furthermore, if a user varies the weighting factors w1 and w2 when viewing a difference image, changes of shadows having many low-frequency components up to changes of objects having many high-frequency components can be continuously displayed in a single display area.

It is noted that a plurality of difference images can be combined. For example, images previously generated and stored in a storage means (not shown) may be used to generate a single difference image based on a plurality of image processing conditions as represented by the following equation (6):

$$S0(x, y) = \\ w1 \times S1(x, y) + w2 \times S2(x, y) + w3 \times S3(x, y) + w4 \times S4(x, y) \quad (6)$$

In this case, four images stored in the storage means (not shown) are weighted and added together.

Accordingly, even if a display area on the display device is limited, changes of an object to be detected can be effectively observed.

Sixth Embodiment

In the above-described embodiments, two processed images IMp1 and IMp2 are generated by applying image processing to the original images IM1 and IM2, and two difference images S1 and S2 are generated from the original images IM1 and IM2 and the processed images IMp1 and IMp2. However, the present invention is not limited to this configuration. That is, a plurality of pairs of temporally sequential images "IMp1 and IMp2", "IMq1 and IMq2", . . . may be generated by applying a plurality of image processing to the original images IM1 and IM2, so that a difference image can be generated corresponding to every pair of processed images.

As described above, according to each of the embodiments of the invention, image processing corresponding to the characteristics of a structure to be observed is applied to a first pair of temporally sequential images to generate a second pair of temporally sequential images. Then, difference processing is applied to the second pair of temporally sequential images to generate a difference image. Accordingly, the difference image effectively shows changes occurring in the structure to be observed.

While the image processing device according to each embodiment is configured to mainly generate a temporal subtraction image, an image processing device or method according to the invention may be configured to process another kind of image. For example, two original images captured nearly simultaneously and having different energy distributions (a high-pressure image and a low-pressure image) and an energy subtraction image obtained from these images may be processed, or two original images of a blood vessel captured before and after injection of a radiopaque dye and a DSA (digital subtraction angiography) image obtained from these images may be processed. Thus, every kind of image can be processed irrespective of that of a living body as long as two or more images of the same object are subjected to comparative reading.

The present invention can also be achieved by providing a system or device with a storage medium that stores a program code of software for implementing the functions of the above-described embodiments, and causing a computer (or a CPU, MPU or the like) of the system or device to read the program code from the storage medium and then to execute the program code.

In this case, the program code itself read from the storage medium realizes the functions of the embodiments, and a storage medium storing the program code and a program containing the program code each constitute the invention.

In addition, the storage medium for providing the program code includes a ROM, a flexible disk, a hard disk, an optical disk, a magneto-optical disk, a CD-ROM, a CD-R, a magnetic tape, a non-volatile memory card, etc.

Furthermore, besides the program code read by the computer being executed to realize the functions of the above-described embodiments, the present invention includes an OS (operating system) or the like running on the computer performing an actual process in whole or in part according to instructions of the program code to realize the functions of the above-described first to sixth embodiments.

Moreover, the present invention also includes a CPU or the like contained in a function expansion board inserted into the computer or in a function expansion unit connected to the computer, the function expansion board or the function expansion unit having a memory in which the program code read from the storage medium is written, the CPU or the like performing an actual process in whole or in part according to instructions of the program code to realize the functions of the above-described embodiments.

If the present invention is applied to the above program or a storage medium storing the program, the program includes, for example, program codes corresponding to the flow of processing described with reference to FIG. 1 or 5A.

As many apparently widely different embodiments of the present invention can be made without departing from the sprit and scope thereof, it is to be understood that the invention is not limited to the specific embodiments thereof except as defined in the claims.

This application claims priority from Japanese Patent Application No. 2004-008119 filed Jan. 15, 2004, which is hereby incorporated by reference herein.

What is claimed is:

1. An image processing device comprising:
   image input means for inputting at least two images captured at different points of time;
   setting means for setting an image processing condition for enhancing temporal change based on information associated with the at least two images received from the image input means;
   image processing means for applying image processing to the at least two images to enhance the contrast of a given range including a target pixel in each of the two images nonlinearly as an average pixel value in the given range decreases on the basis of the image processing condition; and
   difference processing means for performing difference processing on the processed images to generate a difference image,
   wherein the image processing means calculates an average image of each of the at least two images by applying an averaging process to the at least two images, the averaging process comprising replacing the target pixel with an average value of adjacent pixels in the given range including the target pixel,
   wherein the image processing means multiplies a value of a pixel of each of the two averaged images corresponding to coordinates of a pixel of the average image by a coefficient determined depending on a value of the pixel of the average value.

2. An image processing device according to claim 1, wherein the coefficient determined depending on a value of the pixel of the average value is defined by a look-up table in which a value of the pixel of the average value serves as an input value and a coefficient serves as an output value.

3. An image processing device according to claim 1, wherein, in the look-up table, the output value varies continuously in a differential manner relative to changes of a value of the pixel of the average image.

4. An image processing device according to claim 1, wherein the image processing means performs frequency processing.

5. An image processing device according to claim 4, wherein the image processing means performs the frequency processing by producing an average image using the two images and adding a difference image between each of the two images and the average image to each of the two images.

6. An image processing device according to claim 1, wherein the image processing means performs image processing to enhance a specific geometrical pattern of each of the two images.

7. An image processing device according to claim 6, wherein the image processing means applies to each of the two images a morphological operation using a disk filter and a ring filter, and the image processing means obtains a difference value of results of the morphological operation by the disk filter and the ring filter, and outputs the difference value as a processed image.

8. An image processing device according to claim 1, further comprising image-processing-condition selection means for selecting a predetermined image processing condition for each of the two images, and wherein the image processing means generates a processed image based on the selected image processing condition.

9. An image processing device according to claim 8, wherein the image-processing-condition selection means selects an image processing condition based on any one or more of a pixel value distribution of an object on each of the two images, a frequency characteristic of the object and a geometrical characteristic of the object.

10. An image processing device according to claim 1, wherein the difference processing means generates and outputs at least two kinds of difference images by performing difference processing between the two images as well as performing difference processing between the processed images.

11. An image processing device according to claim 1, further comprising display means for displaying the difference image output from the difference processing means.

12. An image processing device according to claim 11, wherein the display means displays a plurality of difference images simultaneously.

13. An image processing device according to claim 11, wherein the display means selectively displays one of a plurality of difference images.

14. An image processing device according to claim 11, wherein the display means displays a composite image generated on the basis of a plurality of difference images.

15. An image processing device according to claim 14, wherein the composite image is generated by applying weighting addition processing to the plurality of difference images.

16. An image processing device according to claim 15, wherein the display means displays the composite image while varying weighting factors for use in the weighting addition processing.

17. An image processing device according to claim 1, wherein the two images are medical images captured at different points of time.

18. An image processing method comprising:
    an image input step of inputting at least two images captured at different points of time;
    a setting step for setting an image processing condition for enhancing temporal change based on information associated with the at least two images received from the image input means;
    an image processing step of applying image processing to the at least two images to enhance the contrast of a given range including a target pixel in each of the two images as an average pixel value in the given range becomes lower on the basis of the image processing condition; and
    a difference processing step of performing difference processing between the processed images to generate and output a difference image, wherein the image processing step calculates an average image of each of the at least two images by applying an averaging process to the at least two images, the averaging process comprising replacing the target pixel with an average value of adjacent pixels in the given range including the target pixel,
    wherein the image processing step multiplies a value of a pixel of each of the two averaged images corresponding to coordinates of a pixel of the average image by a coefficient determined depending on a value of the pixel of the average value.

19. An image processing device according to claim 1, wherein the two images are front chest images, and
    the image processing improves contrast of the mediastinal portion of the front chest images.

20. An image processing method according to claim 18, wherein the two images are front chest images, and
    the image processing is to improve contrast of the mediastinal portion of the front chest images.

* * * * *